United States Patent [19]

Shu

[11] Patent Number: 4,555,538
[45] Date of Patent: Nov. 26, 1985

[54] COMPOSITIONS OF POLYPHENYLENE ETHER RESIN AND HIGH IMPACT POLYSTYRENE RESIN HAVING IMPROVED ULTRAVIOLET LIGHT RESISTANCE

[75] Inventor: Peter H. Shu, Schenectady, N.Y.

[73] Assignee: General Electric Company, Pittsfield, Mass.

[21] Appl. No.: 564,420

[22] Filed: Dec. 22, 1983

[51] Int. Cl.$^4$ .............................................. C08K 5/34
[52] U.S. Cl. .................................. 524/102; 524/336; 524/337
[58] Field of Search ................ 524/102, 611, 336, 337

[56] References Cited

U.S. PATENT DOCUMENTS

| 3,563,934 | 2/1971 | Burnett. | |
|---|---|---|---|
| 3,925,509 | 12/1975 | Cooper et al. | |
| 4,016,138 | 4/1977 | Anderson | 524/611 |
| 4,024,093 | 5/1977 | Abolins et al. | 524/611 |
| 4,288,631 | 9/1981 | Ching | 524/337 |
| 4,315,848 | 2/1982 | Dexter et al. | 524/102 |
| 4,385,146 | 5/1983 | Axelrod | 524/611 |
| 4,444,934 | 4/1984 | Kasahara et al. | 524/611 |

OTHER PUBLICATIONS

A. R. Patel et al, "Ultraviolet Stabilization of Polymers: Development with Hindered-Amine Light Stabilizers", *Stabilization and Degradation of Polymers*, David L. Allara et al, Advances in Chemistry Series No. 169, American Chemical Society, Wash., D.C., 116–132, (1978).

*Primary Examiner*—Veronica P. Hoke
*Attorney, Agent, or Firm*—Hedman, Gibson, Costigan & Hoare

[57] ABSTRACT

The ultraviolet light stability of polyphenylene ether resins and blends is improved by the addition of small amounts of ortho-hydroxy-substituted alkoxybenzophenones and tetraalkyl dipiperidinyl aliphatic diesters in combination, as described. Plasticized, flame retardant and mineral filled versions are also disclosed.

26 Claims, No Drawings

COMPOSITIONS OF POLYPHENYLENE ETHER RESIN AND HIGH IMPACT POLYSTYRENE RESIN HAVING IMPROVED ULTRAVIOLET LIGHT RESISTANCE

BACKGROUND OF THE INVENTION

The polyphenylene ether (oxide) resins are high performance engineering thermoplastics possessing relatively high melt viscosities and softening points, and which are useful in many commercial applications requiring high temperature resistance, including the formation of films, fibers and molded articles. The polyphenylene ether resins and methods of their preparation are described in U.S. Pat. Nos. 3,306,874 and 3,306,875 (Hay), U.S. Pat. Nos. 3,257,357 and 3,257,358 (Stamatoff), and elsewhere.

The polyphenylene ether resins are also known to be admixable with polystyrene resins, unmodified or modified with rubber, as disclosed in U.S. Pat. No. 3,383,435 (Cizek), to form blends which are extrudable or moldable into articles of various shapes and sizes.

Polyphenylene ethers are normally prone to undergoing discoloration, that is, yellowing, during processing at elevated temperatures and, after molding, upon exposure to ultraviolet (UV) light for extended periods. To improve the color stability of these polymers, stabilizing additives are sometimes included. For instance, Cooper, et al. in U.S. Pat. No. 3,925,509 disclose blends of polyphenylene ether resin and high impact, rubber-modified polystyrene resin which have been modified to be more ultraviolet light stable by adding a light absorbing compound selected from among hydroxybenzotriazoles, hydroxybenzophenones, and substituted derivatives thereof in combination with an organic nickel compound. In another case, Bennett in U.S. Pat. No. 3,563,934 discloses that an alkanolamine or a morphaline can be incorporated in a polyphenylene oxide resin to improve the flow and stability of the polymer during molding, and to permit lighter colored objects to be more easily molded from the polymer.

The utilization of polyphenylene ether resin blends in a wider variety of commercial articles increases the likelihood that the polymer will be exposed to sunlight or strong indoor light during use, either of which can cause discoloration of the plastic. It is desirable, therefore, to find additional ways of improving the UV-stability of the polymer without sacrificing other important properties.

INTRODUCTION TO THE INVENTION

The discovery has now been made that certain ortho-hydroxy substituted alkoxybenzophenones and certain tetraalkyl dipiperidinyl aliphatic diesters are useful, in combination, to impart improved ultraviolet light stability to polyphenylene ether resins and blends. The two types of additives are highly effective together, even when added in very small amounts, and articles molded from the resulting compositions exhibit a dramatic reduction in the normal tendency to discolor upon UV aging.

The stabilizer combination is useful especially in the following types of compositions in accordance with this invention:

1. Blends comprising (a) polyphenylene ether resin and (b) stabilizer;

2. Blends comprising (a) polyphenylene ether resin, (b) stabilizer and (c) rubber modified, high impact poly(alkenyl aromatic) resin;

3. Blends comprising (a) polyphenylene ether resin, (b) stabilizer and (c) plasticizer, with or without (d) an impact strength modifier;

4. Flame retardant versions of any of the foregoing; and

5. Filled versions of any of the foregoing.

DESCRIPTION OF THE INVENTION

The invention in its broadest aspects, comprises an admixtures of
(a) a polyphenylene ether resin; and
(b) an effective ultraviolet light stabilizing amount of, in combination,
  (1) one or a mixture of two or more compounds having the formula

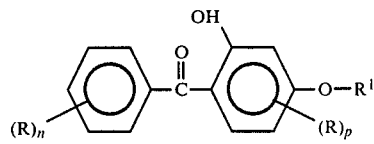

in which $R^1$ is hydrogen, alkyl having from 1 to 25 carbon atoms or aryl; each R is, independently, hydrogen, hydroxy, alkoxy having from 1 to about 10 carbon atoms, alkyl having from 1 to about 10 carbon atoms, or aryl; and n and p are independently zero or an integer from 1 to the total number of replaceable hydrogen atoms on the ring; and
  (2) one or a mixture of two or more compounds having the formula

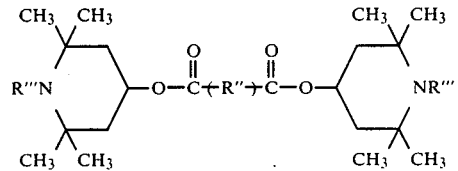

in which $R''$ is alkyl, straight or branched, or aryl unsubstituted or substituted with, for instance, halogen, alkyl, alkoxy, etc.; and $R'''$ is hydrogen or alkyl, but preferably hydrogen.

Ortho-hydroxy substituted alkoxybenzophenones, falling within Formula I above, are known to those skilled in the art. They can be made by reacting 2,4-dihydroxybenzophenone, unsubstituted or substituted with alkyl, alkoxy, aryl or additional hydroxy groups on the ring(s), with an alkyl bromide in the presence of a strong base, for example, aqueous sodium hydroxide, and heating to form the corresponding 2-hydroxy-4-alkoxybenzophenone. Particular examples are available commercially under the trade designations CYASORB 531 (American Cyanamid Co.), VP ARO 8 (American Hoechst Co.), and SYNTASE 800 (Neville-Synthese Organics, Inc.).

The tetraalkyl dipiperidinyl aliphatic diesters of Formula II, above, are described in U.S. Pat. No. 3,640,928 (Murayama, et al.), the disclosure of which is incorporated herein by reference.

Preferably, component (b)(1) is included in a major amount and component (b)(2) in a minor amount, based on the total weight of (b). In general, (b)(1) is present in amounts of from about 0.5 to about 10 parts by weight, and (b)(2) in amounts of from about 0.05 to about 2 parts by weight, for each 100 parts of (a). Larger amounts can be employed and may actually be desirable in some instances, but for most purposes the aforementioned proportions will be sufficient to achieve satisfactory results.

Preferred polyphenylene ether resins are homopolymers or copolymers having units of the formula

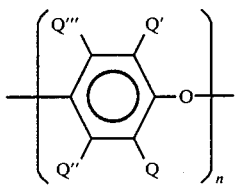

in which Q, Q', Q" and Q''' are, independently, selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

The polyphenylene ether resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2-6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,3,6-trimethylphenol or 2-methyl-6-butylphenol, to produce the corresponding copolymer, for example, poly(2,6-dimethyl-co-2,3,6-trimethyl-1,4-phenylene)ether, poly(2,6-dimethyl-co-2-methyl-6-butyl-1,4-phenylene)ether, and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

The preferred rubber modified, high impact alkenyl aromatic resins, when used, are those in which the alkenyl aromatic portion is derived at least in part from compounds of the formula

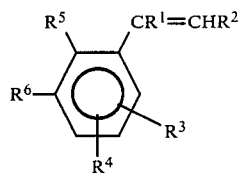

wherein $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms, or $R^5$ and $R^6$ may be concatenated together with hydrocarbyl groups to form a naphthyl group.

Compounds within the above formula include styrene and its homologs and analogs. In addition to styrene, examples include alpha-methyl styrene, para-methyl styrene, 2,4-dimethyl styrene, chlorostyrene, dichlorostyrene, bromostyrene, dibromostyrene, p-tert-butylstyrene, p-ethylstyrene, vinyl xylene, divinylbenzene, and vinyl naphthalene. Styrene is especially preferred.

Suitable rubber modifiers, which can be in admixture or interpolymerized with the alkenyl aromatic resin, include natural rubber, as well as synthetic rubbers such as polyisoprene, polybutadiene, polychloroprene, ethylene-propylene-diene terpolymers (EPDM rubber), styrene-butadiene copolymers (SBR rubber), styrene-acrylonitrile copolymers (SAN), ethylene-propylene copolymers (EPR rubber), acrylonitrile rubbers, polyurethane rubbers and polyorganosiloxane (silicone) rubbers.

The rubber content can vary widely but generally will range in amount from about 5 to about 45 percent by weight, depending on particular requirements of impact resistant modification.

The plasticizer will generally be any high boiling liquid or low melting solid having the effect of softening the composition and reducing the glass transition temperature of the polyphenylene ether resin. The plasticizer may be selected from among non-polymeric and polymeric materials known to exert these effects. By way of illustration, suitable types include linear aliphatic esters based on dibasic acids, such as adipates, azelates and sebacates, or linear aliphatic esters based on phosphorus. Other suitable types include cyclic esters, such as phthalates, terephthalates, benzoates and trimellitates.

Especially preferred are organic phosphate plasticizers, and particularly aromatic phosphate compounds of the formula

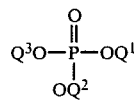

in which each Q represents the same or a different radical selected independently from among alkyl, cycloalkyl, aryl, alkyl-substituted aryl, aryl-substituted alkyl, halogen, and hydrogen, with at least one Q always being aryl.

Examples include phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl)phosphate, diphenyl hydrogen phosphate, bis(2-ethylhexyl)p-tolylphosphate, tritolyl phosphate, bis(2-ethylhexyl)phenyl phosphate, tri(nonyl-phenyl)phosphate, phenylmethyl hydrogen phosphate, di(-dodecyl)p-tolyl phosphate, tricresyl phosphate, triphenyl phosphate, dibutylphenyl phosphate, 2-chloroethyldiphenyl phosphate, p-tolyl-bis-(2,5,5'-trimethylhexyl)phosphate, 2-ethylhexyldiphenyl phosphate, diphenyl hydrogen phosphate, and the like. Most preferred are triphenyl phosphate and its derivatives, for example, isopropylated triphenyl phosphate.

Particular mention is also made of polymeric plasticizing resins, and especially polystyrene homopolymers, which have a plasticizing function and can be used for this purpose in the present blends.

In general, amounts of up to about 30 parts by weight, per 100 parts of the total polymeric ingredients, are employed in the plasticized embodiments, with particular amounts being dependent upon specific requirements.

Plasticized compositions in accordance with the invention can and often do also include effective amounts of an impact strength enhancing modifier or modifiers. These may be selected from polymeric materials customarily employed for this purpose. Typically, they will be copolymers or terpolymers of alkenyl aromatic compounds of the formula shown above with rubber or elastomeric precursors. Preferred are linear block, graft or radial teleblock copolymers or terpolymers of styrene and butadiene, or of styrene and isoprene, as well as hydrogenated versions thereof in which the unsaturation of the aliphatic portion has been reduced. The amounts are conventional.

Other ingredients can and often are included in the compositions. These may be selected from among the various materials customarily employed in polyphenylene either resin blends, including flame retardant agents, mineral fillers (for example, clay, talc, mica or aluminum silicate), reinforcing agents (for example, glass fibers, flakes or spheres or titanate fibers), coloring agents (for example, dyes or pigments), plasticizers, odor suppressants, mold release agents, flow enhancing agents (for example, melt viscosity reducers), and so forth. Those may be employed singly or in various combinations, in amounts which are conventional.

The compositions of this invention may also be formulated to contain one or more flame retardant agents, alone or in combination with supplementary materials known to synergistically enhance their effect. Such additives may be selected from among the numerous materials known to those skilled in the art, which in general will be those compounds, or oligomers or polymers, containing chemical elements employed for their ability to impart flame resistance, for example, bromine, chlorine, antimony, phosphorus and nitrogen. Examples include various aliphatic and aromatic phosphates, phosphonates and phosphites; halogenated (brominated or chlorinated) organic compounds; halogenated organic compounds in admixture with antimony oxide; halogen-containing compounds in admixture with phosphorus compounds containing phosphorus-nitrogen bonds; halogenated (brominated or chlorinated) polymers such as polystyrene and aromatic polycarbonates of their lower molecular weight oligomeric counterparts.

Special mention is made of flame retardant organophosphate compounds, including aromatic phosphate flame retardant-plasticizers such as found among the compounds mentioned above; brominated or chlorinated bis-phenoxy alkanes, e.g., 1,2-bis(2,4,6-tribromophenoxy )ethane or 1,2-bis(2,3,4,5,6-pentabromophenoxy)ethane; di- or polyfunctional phosphates such as disclosed in British Pat. No. 2,043,083; and brominated or chlorinated polystyrenes. Especially preferred are triphenyl phosphate and isopropylated triphenyl phosphate. Amounts of up to 30 parts by weight for each 100 parts of the polymeric components present in the blends are typical.

The compositions may be prepared into shaped articles in any convenient manner. In one procedure, the ingredients are dry or solution blended, the mixture is passed through a screw extruder at a temperature from about 450° to about 650° F., the extrudate is cooled and chopped into pieces, and the pieces are injection molded at a temperature of from about 450° to about 650° F.

The compositions may be prepared into any of the articles for which polyphenylene ether resins and blends are known. They are especially suitable for types of products intended for use in the outdoors where they will be exposed to the sun, or indoors under strong artificial light, either of which can change the original color of the plastic. Illustratively, the present kinds of blends can be manufactured into grilles, headlamp bezels, wheelcovers and decorative trim on automobiles, home laundry and dishwasher consoles, air conditioner grilles, personal care or home use products such as coffee makers, food processors, curling irons, and shower massagers, bases and housings for office business machines, TV cabinets, and so forth.

DESCRIPTION OF THE SPECIFIC EMBODIMENTS

The invention is illustrated in the following examples. These are intended to show best or preferred embodiments and should not be construed as a limitation on the scope of the invention.

EXAMPLE 1

A composition in accordance with the invention was prepared by forming an admixture of 45 parts by weight of poly(2,6-dimethyl-1,4-phenylene ether)resin (PPO ®, General Electric Company), 55 parts by weight of polybutadiene rubber modified high impact polystyrene (Foster Grant's FG-834 HIPS), 13 parts by weight of isopropylated triphenyl phosphate flame retardant agent (KRONITEX 50, FMC Corporation), 1.5 parts by weight of polyethylene mold release-lubricant (REXENE 126), 0.15 part by weight of zinc oxide, 0.15 part by weight of zinc sulfide and 0.5 part by weight of diphenyl dioctyl phthalate (the zinc sulfide, zinc oxide and diphenyl dioctyl phthalate function to provide thermal color stability and odor suppression), and, in addition, for ultraviolet light stability, 2 parts by weight of 2-hydroxy-4-n-octoxybenzophenone (CYASORB 531, American Cyanamid Co.) and 0.2 parts by weight of 2,2,6,6-tetramethyl dipiperidinyl sebacate (TINUVIN 770, Ciba-Geigy, Inc.).

The mixture was extruded at a temperature of 500° F., and the extrudate was molded into test pieces using an injection temperature of 490° F. and a mold temperature of 160° F.

For comparison purposes, a control composition was prepared and molded under the same conditions, except that no CYASORB 531 or TINUVIN 770 were present.

The moldings were tested for UV aging by direct exposure under a Xenon arc lamp at a temperature of 55° C., in an environment having a relative humidity of 55%. The changes in color, $\Delta E$, at various time intervals, are shown in Table 1 below.

TABLE 1

| | UV AGING | | | |
|---|---|---|---|---|
| | $\Delta E$(units), After Exposure For | | | |
| Example | 100 hrs. | 200 hrs. | 300 hrs. | 350 hrs. |
| 1 (This invention) | 0.1 | 2.0 | 4.7 | 5.8 |
| A (Control, no UV stabilizers present) | 2.2 | 7.3 | 10.8 | 12.6 |

In a separate testing procedure, using a fluorescent light source, additional samples were exposed in a Hewlett-Packard UV-Tester, employing a low pressure mercury arc lamp and phosphor glass-filtered sunlamp (TS-40). After 300 hours of exposure, $\Delta E$ for Example 1 was 1.81 units, while $\Delta E$ for Control A was 5.24 units.

The lower values of $\Delta E$ for the composition in accordance with the invention in comparison with the control, in each testing instance, was indicative of better UV stability.

EXAMPLES 2–4

Additional compositions having the same ingredients as described in Example 1, but formulated to contain varying amounts of 2-hydroxy-4-n-octoxybenzophenone(CYASORB 531) and 2,2,6,6-tetramethyl dipiperidinyl sebacate (TINUVIN 770) were prepared into test samples and evaluated for UV color stability by exposure for 21.2 (exposure) days in a Xenon Arc Fadometer at 63° C., 50% relative humidity. The additive amounts and UV aging results are shown in Table 2.

TABLE 2

| Example | CYASORB 531,pbw | TINUVIN 770,pbw | Change in Yellowness Index, $\Delta YI$ | | Color Change, $\Delta E$ | |
|---|---|---|---|---|---|---|
| | | | Direct | Under Glass | Direct | Under Glass |
| 2 | 2 | 0.2 | 36.9 | 21.4 | 16.4 | 10.5 |
| 3 | 3 | 0.3 | 35.0 | 9.1 | 15.5 | 5.1 |
| 4 | 4 | 0.4 | 29.3 | 4.5 | 13.6 | 3.3 |
| B* | — | — | 53.5 | 44.6 | 23.4 | 19.8 |

*Control experiment

EXAMPLE 5

A further composition in accordance with the invention was prepared using 60 parts by weight of poly(2,6-dimethyl-1,4-phenylene ether)resin (PPO), 40 parts by weight of rubber modified high impact polystyrene resin (FG 834), 8 parts by weight of isopropylated triphenyl phosphate (K-50), 1.5 part by weight of low density polyethylene (REXENE 126), 0.15 part by weight of zinc oxide, 0.15 part by weight of zinc sulfide, 0.5 part by weight of diphenyl dioctyl phthalate, 1 part by weight of 2-hydroxy-4-n-octoxybenzophenone (CYASORB 531) and 0.1 part by weight of 2,2,6,6-tetramethyl dipiperidinyl sebacate (TINUVIN 770). The resulting mixture was extruded at 520° F. and injection molded into test pieces at 500° F. (200° F. mold temperature). Testing was accomplished by exposing the test pieces directly under a Xenon arc lamp at 55° C., 55% relative humidity and measuring the color change at various time intervals. The results are reported in Table 3. Again, a control was included.

TABLE 3

| | $\Delta E$ After Exposure For | | | |
|---|---|---|---|---|
| Example | 100 hrs. | 200 hrs. | 300 hrs. | 350 hrs. |
| 5(This invention) | 3.2 | 10.5 | 12.0 | 13.2 |
| C(Control, no UV stabilizer | 6.3 | 13.2 | 14.5 | 15.7 |

Again, it is seen that use of the stabilizer combination, in relatively small amounts, significantly improves the UV color stability of the blend.

EXAMPLES 6–9

These examples illustrate the effect of exposure to an xenon arc lamp of compositions in accordance with the invention comprising 45 parts by weight of poly(2,6-dimethyl-1,4-phenylene ether)resin (PPO), 55 parts by weight of high impact polystyrene (FG-834), 13 parts by weight of isopropylated triphenyl phosphate (KRONITEX 50), 1.5 parts by weight of polyethylene (REXENE 126), 0.15 part by weight of zinc oxide, 0.15 part by weight of zinc sulfide, 0.5 part by weight of diphenyl dioctyl phthalate and, as the light stabilizer, a mixture of tetra-substituted benzophenone and 2,2,6,6-tetramethyl dipiperidinyl sebacate (TINUVIN 770) as shown in Table 4 (the amounts of each are stated in parts by weight).

Preparation of the compositions into molded pieces and testing of the pieces were accomplished using the same procedures described in Example 1. The results are reported in the Table.

TABLE 4

| UV AGING - 21.2 Days Exposure to Xenon Arc | | | | | |
|---|---|---|---|---|---|
| | | $\Delta YI$ | | $\Delta E$ | |
| Ex. | Stabilizers | Direct | Under Glass | Direct | Under Glass |
| 6 | DOBP/TINUVIN 770 2/0.2 | 42.8 | 27.2 | 18.9 | 13.4 |
| 7 | DOBP/TINUVIN 770 4/0.4 | 30.5 | 18.9 | 17.5 | 9.9 |
| 8 | UVINUL 400/TIN 770 2/0.2 | 34.3 | 24.4 | 14.8 | 11.1 |
| 9 | UVINUL 4%/TIN 770 2/0.2 | 25.8 | 17.5 | 12.3 | 8.8 |

TABLE 4-continued

| | UV AGING - 21.2 Days Exposure to Xenon Arc | | | |
|---|---|---|---|---|
| | | Δ YI | | Δ E | |
| Ex. | Stabilizers | Direct | Under Glass | Direct | Under Glass |
| D* | NONE | 53.3 | 45.5 | 23.4 | 20.8 |

*control experiment
DOBP = 4-dodecyloxy-2-hydroxybenzophenone

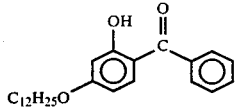

UVINUL 400 = 2,4-dihydroxybenzophenone

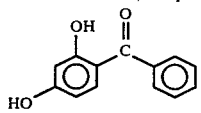

UVINUL 4% = mixture of Uvinul 490, which is 2,2'-dihydroxy-4,4'-dimethoxy benzophenone (see formula below) and other tetra-substituted benzophenone

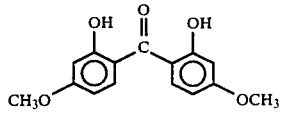

UVINUL - 490

EXAMPLE 10

The procedure of Examples 6-9 was repeated, but using as the light stabilizer the combination of compounds shown in Table 5, with the results reported in the Table.

TAbLE 5

| | UV AGING - 21.3 Days Exposure to Xenon Arc | | | |
|---|---|---|---|---|
| | | Δ YI | | Δ E | |
| Ex. | Stabilizers | Direct | Under Glass | Direct | Under Glass |
| 10 | UVINUL M40/Tin 770 | 33.9 | 11.3 | 15.7 | 6.3 |
| E* | None | 49.3 | 43.7 | 21.7 | 19.9 |

*control experiment
UVINUL M40 = 4-methoxy-2-hydroxybenzophenone

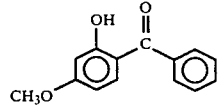

EXAMPLES 11-16

The procedure of Examples 6-9 was again repeated, this time using as a light stabilizer the combination of compounds identified in Table 6, in the varying amounts shown.

TABLE 6

| | UV AGING - 20.2 Days Exposure to Xenon Arc | | | |
|---|---|---|---|---|
| | | ΔYI | | ΔE | |
| Ex. | Stabilizers** | Direct | Under Glass | Direct | Under Glass |
| 11 | CYA 531/TIN 770 1/0.1 | 42.3 | 35.7 | 18.9 | 16.4 |
| 12 | 1/0.2 | 40.4 | 25.6 | 18.1 | 12.3 |
| 13 | 1/0.4 | 38.8 | 14.7 | 17.5 | 7.5 |
| 14 | 1/0.6 | 36.2 | 13.0 | 16.5 | 6.7 |
| 15 | 1/0.8 | 33.4 | 7.1 | 15.3 | 4.1 |
| 16 | 1/1 | 34.0 | 5.3 | 15.5 | 3.2 |

TABLE 6-continued

| | UV AGING - 20.2 Days Exposure to Xenon Arc | | | |
|---|---|---|---|---|
| | | ΔYI | | ΔE | |
| Ex. | Stabilizers** | Direct | Under Glass | Direct | Under Glass |
| F* | None | 50.2 | 39.0 | 21.9 | 17.9 |

*Control experiment
**Same as in Example 1

All of the patents mentioned above are incorporated herein by reference.

Other modifications and variations of the invention are possible in the light of the above disclosure. For, instance, clay filled or glass reinforced versions of the blends are possible. It is to be understood, therefore, that changes may be made in the particular embodiments shown which are within the scope of the invention as defined in the appended claims.

I claim:

1. A thermoplastic composition, comprising an admixture of
   (a) a polyphenylene ether resin; and
   (b) an effective amount of an ultraviolet light stabilizing combination of
   (1) one or a mixture of two or more compounds having the formula

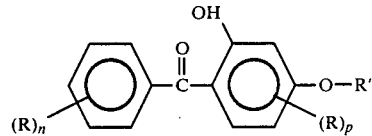

in which R' is hydrogen, alkyl having from 1 to 25 carbon atoms or aryl; each R is, independently, hydrogen, hydroxy, alkoxy having from 1 to about 10 carbon atoms, alkyl having from 1 to about 10 carbons atoms, or aryl; and n and p are independently zero or an integer from 1 to the total number of replaceable hydrogen atoms; and
   (2) one or a mixture of two or more compounds having the formula

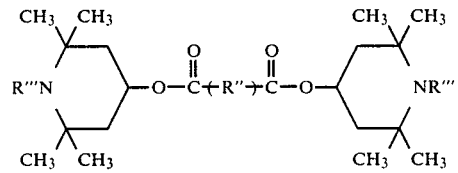

in which R" is alkyl, straight or branched, or aryl unsubstituted or substituted, in which (b)(1) is present in an amount from about 0.5 to about 10 parts by weight, and (b)(2) is present in an amount from about 0.05 to about 1 part by weight, per 100 parts of (a) and (b) together.

2. A composition according to claim 1, in which the polyphenylene ether resin is a homopolymer or copolymer having units of the formula

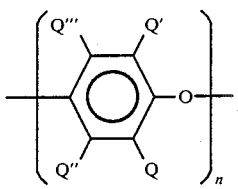

in which Q, Q', Q" and Q''' are, independently, selected from the group consisting of hydrogen, halogen, hydrocarbon radicals, halohydrocarbon radicals, hydrocarbonoxy radicals, and halohydrocabonoxy radicals, and n represents the total number of monomer units and is an integer of at least about 20.

3. A composition according to claim 1, in which the polyphenylene ether resin is poly(2,6-dimethyl-1,4-phenylene ether).

4. A composition according to claim 1, in which (b)(1) is present in a major amount and (b)(2) is present in a minor amount, based on the weight of (b).

5. A composition according to claim 1, in which (b)(1) is 2-hydroxy-4-n-octoxybenzophenone and (b)(2) is 2,2,6,6-tetramethyl dipiperidinyl sebacate.

6. A composition according to claim 1, in which (b)(1) is 4-dodecyloxy-2-hydroxybenzophenone and (b)(2) is 2,2,6,6-tetramethyl dipiperidinyl sebacate.

7. A composition according to claim 6, in which (b)(1) is 2,4-dihydroxybenzophenone and (b)(2) is 2,2,6,6-tetramethyl dipiperidinyl sebacate.

8. A composition according to claim 1, in which (b)(1) comprises a mixture of 2,2'-dihydroxy-4,4'-dimethoxy benzophenone and other tetra-substituted benzophenone, and (b)(2) is 2,2,6,6-tetramethyl dipiperidinyl sebacate.

9. A composition according to claim 1, which (b)(1) is 4-methoxy-2-hydroxybenzophenone and (b)(2) is 2,2,6,6-tetramethyl dipiperidinyl sebacate.

10. A composition according to claim 1, which includes (c) a rubber modified high impact poly(alkenyl aromatic)resin.

11. A composition according to claim 10, in which the alkenyl aromatic resin comprises at least some units of the formula

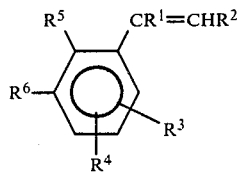

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms, or $R^5$ and $R^6$ may be concatenated together with hydrocarbyl groups to from a naphthyl group.

12. A composition according to claim 11, in which the alkenyl aromatic resin is polystyrene.

13. A composition according to claim 12, in which the rubber modifier for the polystyrene is polybutadiene.

14. A composition according to claim 11, in which the weight ratio of polyphenylene ether resin (a) and rubber modified, high impact poly(alkenyl aromatic) resin (c) is between 5:95 and 95:5.

15. A composition according to claim 1, which includes an effective amount of (c) a plasticizer, with or without an impact modifier.

16. A composition according to claim 15, in which the plasticizer is present in an amount up to about 30 parts by weight per 100 parts of the polymericc components in the composition.

17. A composition according to claim 16, in which the plasticizer is an aromatic phosphate compound.

18. A composition according to claim 17, in which the aromatic phosphate is triphenyl phosphate.

19. A composition according to claim 18, in which the triphenyl phosphate is isopropylated.

20. A composition according to claim 16, which includes (d) an impact modifier.

21. A composition according to claim 20, in which the impact modifier, (d), is a linear block, graft or radial teleblock copolymer or terpolymer of styrene and a diene, hydrogenated or non-hydrogenated.

22. A composition according to claim 1, 11 or 16, which includes a flame retardant amount of a flame retardant agent.

23. A composition according to claim 22, in which the flame retardant agent is selected from among organic phosphates, brominated bis-phenoxy alkanes and halogenated polystyrenes.

24. A composition according to claim 23, in which the flame retardant agent is an aromatic phosphate.

25. A composition according to claim 24, in which the aromatic phosphate is isopropylated triphenyl phosphate.

26. A composition according to claim 1, 11, 16 or 23 which includes a mineral filler and/or glass reinforcement.

* * * * *

UNITED STATES PATENT AND TRADEMARK OFFICE
CERTIFICATE OF CORRECTION

PATENT NO. : 4,555,538
DATED : November 26, 1985
INVENTOR(S) : PETER H. SHU

It is certified that error appears in the above—identified patent and that said Letters Patent is hereby corrected as shown below:

In Column 12, on line 24, the number "11" should read --10--; on line 33, the word "polymericc" should read --polymeric--; on line 35, the number "16" should read --15--; on line 41, the number "16" should read --15--; on line 47, the numbers "1, 11 or 16" should read --1, 10 or 15--; and on line 59, the numbers "1, 11, 16 or 23" should read --1, 10, 15 or 22--.

Signed and Sealed this

Twelfth Day of August 1986

[SEAL]

Attest:

DONALD J. QUIGG

Attesting Officer     Commissioner of Patents and Trademarks